US010819517B2

(12) United States Patent
Bruner et al.

(10) Patent No.: US 10,819,517 B2
(45) Date of Patent: Oct. 27, 2020

(54) INTEGRATED PAYMENT CONTROLLER

(71) Applicant: Imonex ClearToken, LLC, Sealy, TX (US)

(72) Inventors: Philemon L. Bruner, Sealy, TX (US); Randy Gietzen, Sealy, TX (US)

(73) Assignee: Imonex ClearToken, LLC, Sealy, TX (US)

( * ) Notice: Subject to any disclaimer, the term of this patent is extended or adjusted under 35 U.S.C. 154(b) by 268 days.

(21) Appl. No.: 15/896,797

(22) Filed: Feb. 14, 2018

(65) Prior Publication Data

US 2019/0253250 A1  Aug. 15, 2019

(51) Int. Cl.
*H04L 9/32* (2006.01)
*G06Q 20/08* (2012.01)
*G06Q 20/36* (2012.01)
*G06F 21/44* (2013.01)
*G06F 21/88* (2013.01)

(52) U.S. Cl.
CPC .......... *H04L 9/3213* (2013.01); *G06F 21/445* (2013.01); *G06F 21/88* (2013.01); *G06Q 20/0855* (2013.01); *G06Q 20/367* (2013.01)

(58) Field of Classification Search
CPC ..... H04L 9/3213; G06F 21/88; G06F 21/445; G06Q 20/0855; G06Q 20/367
See application file for complete search history.

(56) References Cited

U.S. PATENT DOCUMENTS

| 10,304,057 | B1* | 5/2019 | Powell | G06Q 20/322 |
| 2002/0135494 | A1* | 9/2002 | Nanjo | G08C 25/02 340/870.07 |
| 2013/0173474 | A1* | 7/2013 | Ranganathan | G06Q 20/0655 705/67 |
| 2014/0166745 | A1* | 6/2014 | Graef | G07F 19/00 235/379 |
| 2016/0335620 | A1* | 11/2016 | Lyons | G07F 7/00 |
| 2017/0346923 | A1* | 11/2017 | Gong | H04L 67/16 |
| 2018/0012247 | A1* | 1/2018 | Francis | G06Q 30/0237 |
| 2019/0340638 | A1* | 11/2019 | Francis | G06Q 20/327 |

* cited by examiner

*Primary Examiner* — Michael R Vaughan
(74) *Attorney, Agent, or Firm* — Duane Morris LLP

(57) ABSTRACT

A system and method of operating one or more selectively-operated devices is disclosed. The method includes establishing, by a controller, a communication channel with a communication device and receiving, by the controller, an authorization token from the communication device. The authorization token includes a verification value. The controller extracts the verification value from the received authorization token and compares the verification value of the authorization token to a plurality of stored verification value. When the authorization token is verified, the controller transitions to a programmable mode.

20 Claims, 9 Drawing Sheets

INTEGRATED PAYMENT CONTROLLER

BACKGROUND

Many industries sell products or services by accepting physical coins or tokens as payment for services, such as laundry machines, vending machines, arcade machines, gambling machines, etc. Owners and operators of such devices visit machines and remove coins and/or tokens received by the machines to be counted. After counting, revenue from the machines is divided according to predetermined arrangements, for example, with site owners. Current systems lack accountability due to theft, loss, and/or miscounting of coins and/or tokens during transportation, processing, and/or distribution. Therefore, in almost all cases, owners are forced to collect the revenue.

Some systems allow users to configure one or more settings for a vending machine or other coin operated machine by setting one or more manual switches or settings in the machine. Configuring the settings of a machine requires a user to physically interact with the machine. Current systems involve adjusting settings for each machine manually and individually.

In some industries, payments are made based on interactions between users and sites, equipment, or other physical elements. An event/equipment operator may be tasked with maintaining a count of interactions with specific locations, equipment, etc. for calculating payment based on one or more contracts or other terms. Maintaining accurate counts, providing data for audits, calculating payments, and providing other functions can be time consuming and cost-prohibitive for many owners/operators.

SUMMARY

In various embodiments, a method is disclosed. The method includes a step of establishing, by a controller, a communication channel with a communication device. The controller receives an authorization token from the communication device that includes a verification value and extracts the verification value from the received authorization token. The controller compares the verification value of the authorization token to a plurality of stored verification values. The controller is operated in a programmable mode in response to the authorization token being verified. The controller is configured to modify configuration data for at least one selectively-operated device in the programmable mode.

In various embodiments, a method is disclosed. The method includes a step of establishing, by a communications device, a communication channel with a controller and transmitting, by the communications device, an authorization token. The authorization token includes a verification value. The communications device receives a configuration signal indicative of one or more current configuration settings of the controller. The configuration signal includes configuration data for at least one selectively-operated device in signal communication with the controller.

In various embodiments, a system is disclosed. The system includes a currency mechanism, a controller, and at least one selectively operated device. The currency mechanism is configured to receive physical currency and generate a currency signal indicative of a value of the received currency. The controller is configured to receive the currency signal. The at least one selectively-operated device is in signal communication with the controller and is configured to provide configuration data to the controller. The controller is configured to establish a communication channel with a communication device and receive an authorization token from the communication device. The authorization token includes a verification value. The controller is further configured to extract the verification value from the received authorization token, verify the authorization token, and transition to a programmable mode when the authorization token is verified.

BRIEF DESCRIPTION OF THE DRAWINGS

The features and advantages will be more fully disclosed by the following detailed description of the preferred embodiments, which are to be considered together with the accompanying drawings wherein like numbers refer to like parts and further wherein.

DETAILED DESCRIPTION

Figure 1:
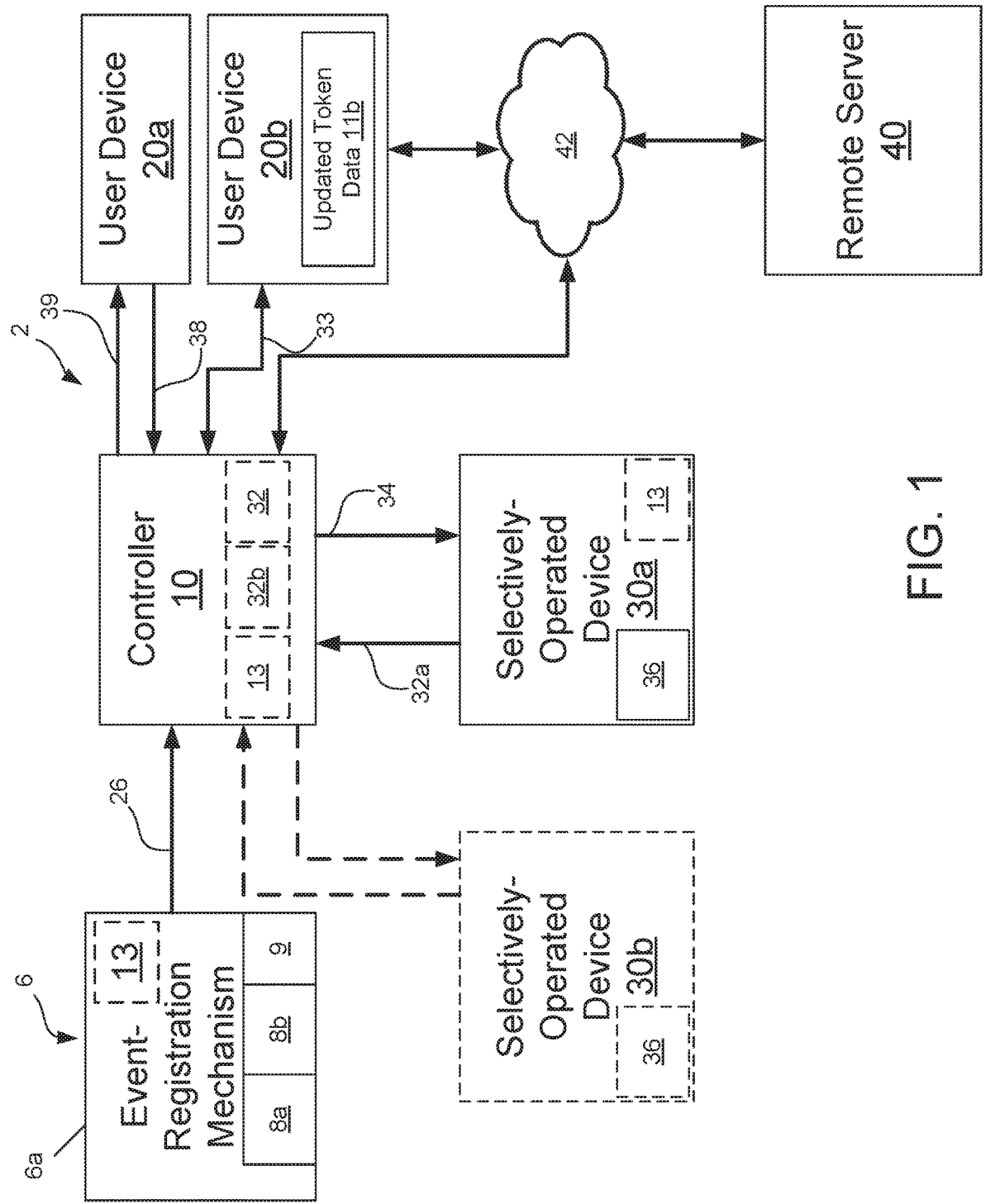
FIG. 1 illustrates a system for monitoring and activating one or more selectively-operated devices, in accordance with some embodiments.

This description of the exemplary embodiments is intended to be read in connection with the accompanying drawings, which are to be considered part of the entire written description. Terms concerning electrical attachments, such as "electrically coupled" or "in signal communication" refer to a relationship wherein elements are configured to exchange electrical signals either directly or indirectly through intervening elements or electrical components, either wired or wirelessly.

In various embodiments, a system for activating or authorizing operation of one or more machines and/or maintaining telemetry data and/or configuration data for one or more portions of the system is disclosed. The system includes an event-registration mechanism for identifying an activation event (for example receiving physical currency, physical tokens, digital tokens, entrance events, exit events, and/or any other suitable activation event). The event-registration mechanism is in signal communication with a controller. The controller is configured to receive a signal from the event-registration mechanism indicative of an activation event. The controller includes a communications system configured to transmit and/or receive data, such as telemetry data, payment data, etc., to and/or from a user device. The controller can be configured to receive electronic token payments, credit and/or debit card payments, and/or other electronic payments via one or more inputs, such as the communications system. The controller may be further configured to transmit telemetry data, including revenue data, use data, etc. A user device includes a transmitter configured to generate an interrogation signal for the controller. In some embodiments, the controller receives the interrogation signal and generates a response signal including the telemetry data.

In some embodiments, the disclosed system and methods provide for an owner of selectively-operated devices, such as a payment or token-operated washing machines, vending machines, etc., to selectively establish connections with one or more modules (i.e., payment-operated devices) to retrieve audit data, upload software updates, and/or perform additional interactions with the payment-operated devices simultaneously. The system integrated in the selectively-operated devices remains dormant until activated by a companion device controlled and/or maintained by the machine owner. In some embodiments, the systems and methods are configured to operate a switch control configured to maintain limited access to the module, applications, and features of the system. In some embodiments, the systems and methods do not require tokens to connect and/or perform additional functions.

In some embodiments, the disclosed systems and methods provide for a system to monitor one or more events and/or actions and provide telemetry data and/or payment data with respect to the monitored events. For example, in some embodiments, an event-registration mechanism is configured to monitor one or more activation events (for example, events monitored by one or more optical sensors). The event-registration mechanism is in signal communication with a controller configured to collect telemetry data with respect to the one or more activation events and/or the event-registration mechanism. The controller may be configured to retrieve audit data, upload software updates, and/or perform additional interactions with the payment-operated devices simultaneously.

FIG. 1 illustrates a system 2 for monitoring, activating and/or authorizing payment for and/or based on one or more interactions with selectively-operated devices 30a, 30b, and monitoring telemetry data and configuration data of one or more portions of the system 2, in accordance with some embodiments. The system 2 includes an event-registration mechanism 6 configured monitor one or more activation events. For example, in the illustrated embodiment, the event-registration mechanism is a payment mechanism configured to receive physical currency, such as coins, bills, tokens, and/or other physical currency. As discussed in greater detail herein, the event-registration mechanism 6 can be configured to monitor any suitable event, such as a payment event, an entrance event, an activation event, a registration event, and/or any other suitable event.

In some embodiments, the event-registration mechanism 6 includes a sensor 8a configured to detect a physical event, such as deposit of one or more physical objects (e.g., physical currency, tokens, cards, etc.), movement of an object and/or person through a predetermined location, activation of mechanisms to render or deliver goods and services, and/or any other suitable physical event. For example, in some embodiments, the event-registration mechanism 6 is configured to detect one or more physical objects passing through one or more openings or positions 9. In some embodiments, the opening 9 is formed in a housing 6a of the event-registration mechanism 6. In some embodiments, the opening 9 is located remotely from the event-registration mechanism 6 and is defined by any suitable physical structures, such as doors, walls, containers, ropes, etc.

The sensor 8a can include any suitable device, module, or subsystem capable of detecting properties, changes or events in its environment, such as an optical sensor (e.g., an electro-optical sensor), an ultrasonic sensor, a passive infrared sensor, an active infrared sensor, a microwave sensor, a tomographic sensor, a video sensor (such as a video recorder in conjunction with one or more image processing systems), a mechanical sensor (e/g., a switch, button, etc.), an acoustic sensor, a biological sensor, a chemical sensor, an electrical sensor (e.g., a piezo-based sensor, coil-based sensor, etc.), a spatial sensor, a thermal sensor, or the like. For example, in some embodiments, the sensor 8a includes an electro-optical sensor having one or more infrared light transmitters (e.g., sources) and one or more infrared receivers. The electro-optical sensor includes an infrared light transmitter and an infrared receiver. A beam of infrared light exists between the transmitter and receiver. Physical objects, such as coins, tokens, people, containers, etc., passing through the electro-optical sensor will temporarily interrupt the beam of light, which is detected by the receiver. In some embodiments, the event-registration mechanism 6 includes multiple sensors 8a, 8b, for example, a plurality of sensors positioned at an opening, exit, and/or at any point along a predefined path monitored by the event-registration mechanism 6. In some embodiments, one or more sensors are configured as "anti-cheat" sensors configured to generate one or more signals to verify that objects travel in a single direction with respect to the event-registration mechanism 6. For example, in various embodiments, one or more anti-cheat sensors are configured to verify deposition of physical objects and/or prevent fraudulent removal of deposited physical objects. Although embodiments are discussed herein including an event-registration mechanism 6 configured to receive and/or monitor physical events, it will be appreciated that the event-registration mechanism 6 can be configured to monitor digital events, such as digital payments and/or transfer of digital objects, such as, for example, credit card payment, currency validators, digital payments (e.g., Near Field Technology payments, software-based payment systems, cryptocurrency, etc.), multi-drop bus payments, digital tokens, digital authorization codes, digital files, and/or any other suitable input that can be collected, controlled, and validated through one or more of the systems and methods disclosed herein.

Figure 1A:
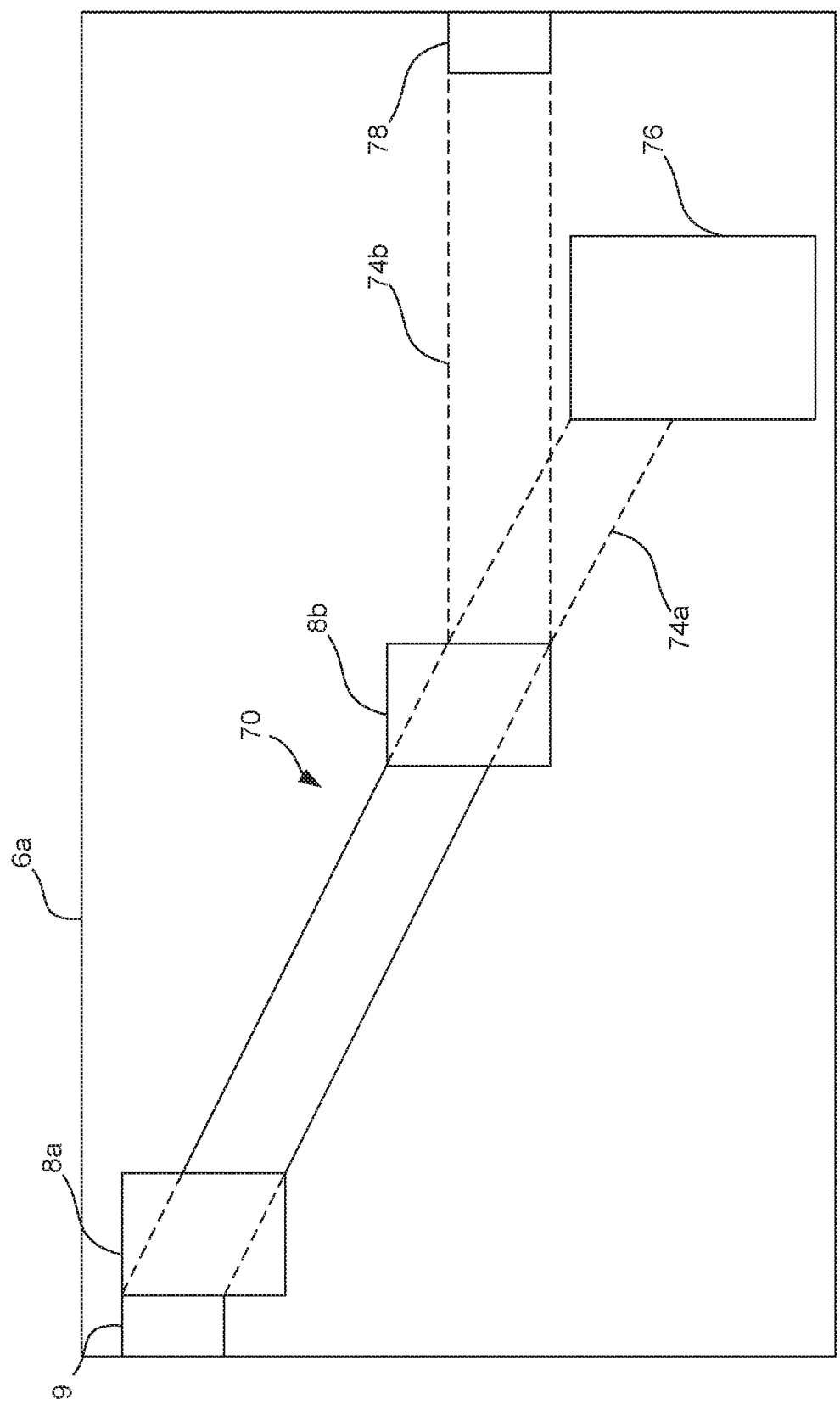
FIG. 1A illustrates a predetermined path of a event-registration mechanism of the system illustrated in FIG. 1, in accordance with some embodiments.

In some embodiments, the event-registration mechanism 6 includes a predefined path 70, as illustrated in FIG. 1A. A first sensor 8a may be positioned at or adjacent to an opening 9 and/or other initial position of the path. In some embodiments, a second sensor 8b is positioned at a second point on the predefined path 70. For example, the second sensor 8b may be positioned a predetermined distance from the first sensor 8a, such as a distance equal to or greater than a maximum diameter of a currency unit that is accepted at the event-registration mechanism 6, a distance equal to a maximum container or object size accepted at the event-registration mechanism 6, and/or any other predetermined distance. In some embodiments, the second sensor 8b may be positioned at or near a branching path 74a, 74b of the predefined path 70. A first branch 74a of the predefined path 70 may correspond to an acceptance of the physical object (e.g., routing of the physical object to a selected location 76, such as routing physical currency to an internal storage container, routing packages/containers to a warehouse or other storage area, etc.) while a second branch 74b of the path may correspond to rejection of the physical object (e.g., routing to a return slot 78 such as a coin return, rejected package area, etc.). Although FIG. 1A only shows a first branch 74a, 74b, other embodiments can have additional branches for additional and/or alternative routing paths. Although the predefined path 70 is illustrated as being located within the housing 6a, it will be appreciated that the predefined path 70 can be located remotely from and/or not integrated with the housing 6a.

In some embodiments, a controller 10 is in signal communication with the event-registration mechanism 6. The controller 10 is configured to receive event information from the event-registration mechanism 6. The event information is indicative of the number, type, value, size, etc. of objects (such as currency, containers, etc.) detected by the event-registration mechanism 6. In some embodiments, the event-registration mechanism 6 is configured to generate a specific signal 26 indicative of the physical object and/or event detected by the sensors 8a, 8b.

For example, in some embodiments, the event-registration mechanism 6 is a payment mechanism configured to receive physical currency and generate a signal indicative of a value of each unit of currency received therein (e.g., a first signal corresponding to a unit of currency having a first currency value such as $0.25, a second signal corresponding to a unit of currency having a second currency value such as $1.00, etc.). The event-registration mechanism 6 generates a signal 26 for each unit of currency deposited therein. As another example, in some embodiments, the event-registration mechanism 6 is a payment mechanism configured to store currency information internally (for example, in a volatile and/or non-volatile memory) and provide a signal 26 indicative of a total currency value received by the event-registration mechanism 6 to the controller 10 at predetermined intervals and/or upon request. The total currency value may be a value of currency received during a currency interval (i.e., the value received since the last transmission of signal 26) or the total value of currency received by the event-registration mechanism 6 (i.e., a cumulative total). As yet another example, in some embodiments, the event-registration mechanism 6 is a package registration system configured to generate a signal indicative of each type of physical package received along a predetermined path 70. As another example, in some embodiments, the event-registration mechanism 6 is configured to detect movement of one or more persons along a predetermined path 70 and generate a signal indicative of the number of people detected by the event-registration system 6.

The controller 10 may be formed and/or housed integrally with and/or separate from the event-registration mechanism 6. The controller 10 and the event-registration mechanism 6 can be in signal communication using any suitable communication channel, such as any suitable wired and/or wireless communication channel. In some embodiments, the signal 26 is provided to one or more selectively-operated devices 30a, 30b in addition to and/or alternatively to the controller 10.

In some embodiments, the controller 10 is configured to receive one or more signals indicative of a digital input. For example, in some embodiments, the controller 10 is configured to receive a signal indicative of a digital transfer of currency, a credit card payment, a token transfer, a digital file, and/or any other suitable digital input from a user device 20a. In some embodiments, the controller 10 is configured to receive a digital token indicative a predetermined currency amount and/or a predetermined purchase transaction. The controller 10 is configured to process the digital token and/or digital payment as discussed in greater detail below. Digital payments and/or inputs can include, but are not limited to, serial signals, pulse signals, MultiDrop Bus (MDB) signals, DEX ASCII code-based electronic audit files, blockchain-based inputs (e.g., bitcoin, smart contracts, etc.), biometric inputs, etc.

Figure 2:
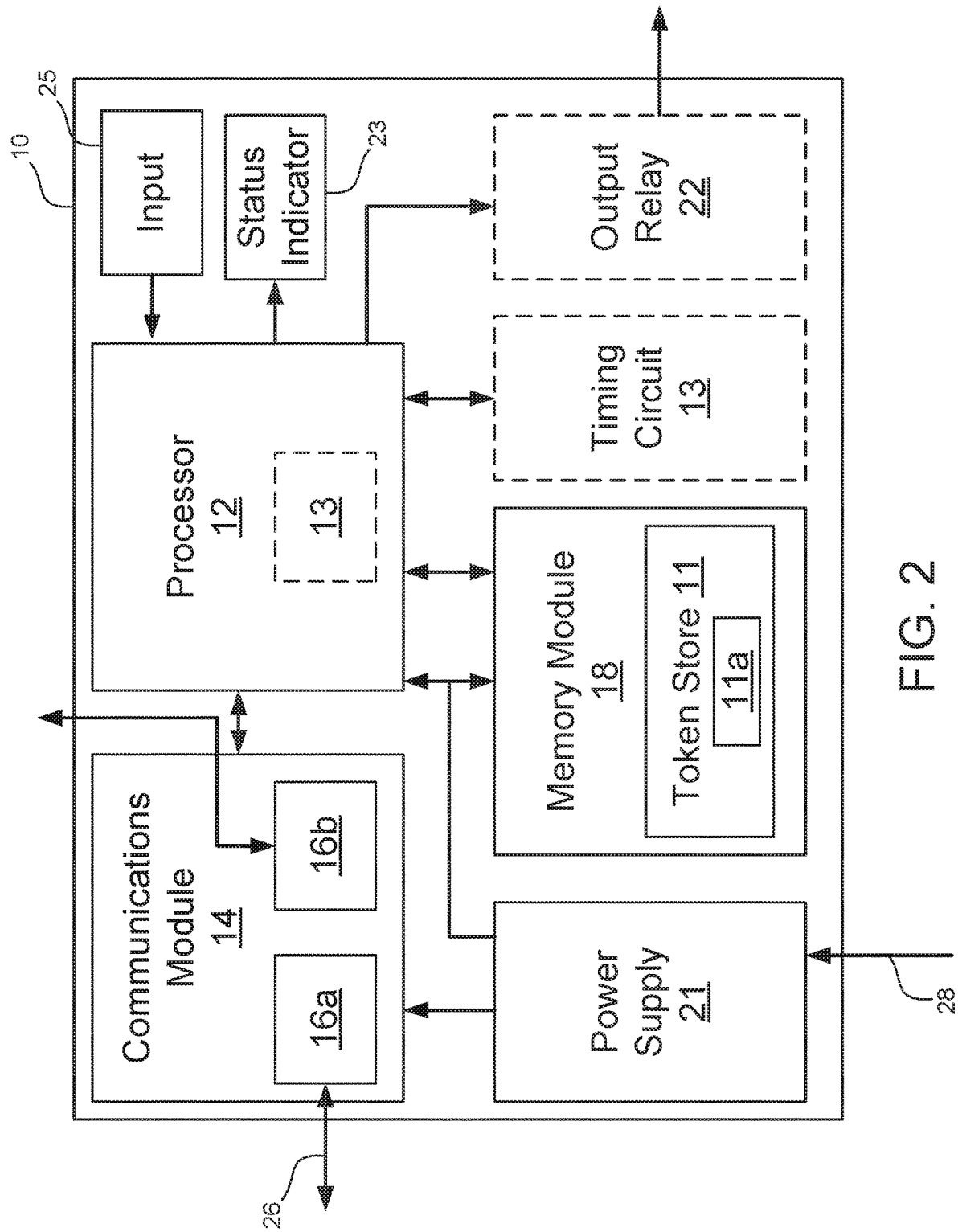
FIG. 2 illustrates a controller configured to be coupled to an event-registration mechanism and one or more selectively-operated devices, in accordance with some embodiments.

In some embodiments, the controller 10 illustrated in FIG. 2 is configured to decrypt and/or otherwise process a received digital token. For example, in some instances, the controller 10 receives a digital token from user device 20a, 20b and accesses a token store 11 (e.g., token database) maintained in a tangible, non-transitory memory. The token store 11 maintains data associated with one or more valid digital tokens that may be received by the controller 10. For example, in some instances, the token store 11 includes at least one token look-up table 11a including a plurality of codes associated with and/or capable of being assigned to one or more digital tokens generated by a remote token generation system and provided to, for example, a user device 20a, 20b. The controller 10 may compare a code contained within and/or a hash value determined from the digital token with the codes (or hash values) stored in the token look-up table 11A. If a matching code is identified, the digital token is verified and additional payment information is extracted from the digital token. If a matching code (or hash value) is not identified, the digital token is considered invalid and is discarded by controller 10.

For example, in some embodiments, the controller 10 is configured to communicate with one or more user devices 20a, 20b configured to provide a digital token. The controller 10 advertises, or broadcasts, availability of the controller 10 and/or the payment-operated device 30 over a selected wireless communication channel, such as, for example, Bluetooth Low-Energy (BLE), Bluetooth 4.0, Bluetooth Smart, Near Field Communication, Radiofrequency Identification (RFID), etc. The user device 20a is configured to scan for nearby devices on the selected communication channel. In some embodiments, the controller 10 advertises at a first interval and the user device 20a scans at a second interval that is faster than the first interval. In some embodiments, the first interval and/or the second interval can be configured by a user, for example, according to the method of updating parameters of the controller 10 discussed below.

In some embodiments, the user device includes two methods of scanning for the controller 10: a first mode configured to scan all devices within range of the user device 20a and a second mode configured to scan for a specific device, for example, using a specific universally unique identifier (UUID) value. For example, in some embodiments, a UUID may be selected for a service associated with the payment-operated device 30a and/or with the specific payment-operated device 30a. The user device 20a may utilize a generic access protocol (GAP) for scanning and identifying one or more controllers 10.

After using the generic access protocol (GAP) to find a device, a generic attribute profile (GATT) may be used for "service discovery" to find the supported "characteristics" for each controller 10 and/or attached payment-operated device 30a. Each characteristic may have an associated UUID and handle, and can be read or written. Each UUID may have one or more values, such as, for example, a 16-bit UUID that is a standard service or characteristic and a 128-bit UUID that is a custom service that is vendor specific, although it will be appreciated that the UUID can include any suitable values.

In various embodiments, the controller 10 is configured to perform one or more functions related to receiving and/or validating a digital token. Table 1 below illustrates various example functions provided by the controller 10, in accordance with some embodiments. For example, in some embodiments, the controller 10 is configured to provide three functions: a GAP service, a Device Information Service, and a Token Handler Service. As shown in Table 1, each service has one or more characteristics associated therewith. Each characteristic can be read to obtain a value and/or written to set a value. In some embodiments, a handle is assigned to each characteristic. The controller 10 and/or the user device 20a implement one or more predetermined routines to determine a handle based on a UUID value.

TABLE 1

| TABLE 1: Services Provided By Token Handler | |
| --- | --- |
| 1800 | GAP Service |
| 2A00 | Device Name |
| 2A01 | Appearance (0 = Unknown) |
| 180A | Device Information Service |
| 2A29 | Manufacturer Name String (Clancy Systems) |
| 2A24 | Model Number String (Clear Token Meter) |
| 2A27 | Hardware Revision String (B) |
| 2A26 | Firmware Revision String (001.003.000.110) |
| 2A28 | Software Revision String (1.31) |
| c9cab9b8-3abf-4043-a5af-9ad00c6074d5 | Token Handler Service |
| 0f314942-e257-46a9-a8c8-4c8ecee2cf2b | ID (currently the 5 character ID on label, e.g. AAA01) |
| d5dee9b5-456f-4baa-ad5c-a3f14fd2653c | Command |
| 2902 | Client Characteristic Configuration (for Command) |
| d5dee9b6-456f-4baa-ad5c-a3f14fd2653d | Beacon Data (Data1) |

In the embodiment illustrated in Table 1, a GAP service has two characteristics. Device name is currently the ID of the controller 10. In some embodiments, an appearance value is set to zero ("unknown") because the controller 10 doesn't fall into a predefined category of devices defined by specific UUID values (e.g., heart rate monitors, phones, etc.) Some devices (e.g., APPLE™ devices) require that a Device Information Service be provided on each device. In some embodiments, a Token Handler Service has three characteristics and one Client Characteristic Configuration. The ID is read only and, in some embodiments, corresponds to an ID that is physically printed on a controller 10 and/or a payment-operated device 30a. The command characteristic can be written and a return code can be read. Before the command characteristic can be used, a specific value may be written to the Client Characteristic Configuration.

After writing the specific value, commands and data can be exchanged with the controller 10. Commands are sent to the controller 10 by writing up to 20 bytes to the Command characteristic handle. Data is received back through the same handle with "notification." After communication, the connection is disconnected. The controller 10 finishes carrying out any tasks and subsequently enters a sleep mode to minimize connection time to the controller 10 and to conserve battery power.

In some embodiments, the commands and data are in arrays of bytes, with values from 0x00 to 0xFF. The number of bytes sent or received through the first-in-first-out (FIFO) handle is 20 or less at a time. In some embodiments, commands to the controller 10 begin with a predetermined value (For example, 0x40 (@)) and a byte following the predetermined value in the array is the number of remaining bytes in the command. In some embodiments, the general format of a command is @N C P P I I T T, wherein:
@=0x40
N=Number of bytes to follow
C=Command code (1 byte)
P=Parameters for the command (number of bytes varies with each command)
I=Index of the validating token (2 bytes, most significant first)
T=validating token (2 bytes, most significant first)
As another example, in some embodiments, the general format of the command is: @ N C P I T H M S R, wherein:
@=0x40—Start of the command
N=Number of bytes to follow
C=Command Code
P=Time (used in Closure & Backlight)
I=Index Value
T=Token Value
H=Hours
M=Minutes
S=Seconds
R=Reset (00=No Reset—01=Reset)
Although specific embodiments are discussed herein, it will be appreciated that any suitable format and/or scheme can be used for commands.

In some embodiments, commands, data, and/or tokens can be sent from the user device 20a as a two-part message, wherein part one is a gatekeeper command or message including a unique code and informing the controller 10 at the payment-operated device 30a that part two is following. A second unique code is sent as part two as an activating command or message. Although embodiments are discussed herein including a two-part message, it will be appreciated that any suitable number of commands and/or parts can be used to secure communication between the controller 10 and the user device 30a.

In some embodiments, the general format of a reply is: R N S, wherein:
R=0x52
N=number of bytes to follow
S=status (0x01 if command was successful or 0x00 if there was an error).

In some embodiments, validating tokens are implemented with the commands. For example, in some embodiments, there may be 65536 index positions (0-65535), with each index containing a token with a value from 1-65535. Once a token is used, it is zeroed to prevent re-use and thus reduce fraud. If an incorrect index/token combination is received, the device responds with a status of 0x00, and not respond to further commands until some time has passed. Additional information regarding tokens and/or token payments can be found in U.S. Patent Appl. Pub. No. 2017/0140347, entitled "Secure Electronic Payment," and published on May 18, 2017, the disclosure of which is incorporated by reference herein in its entirety.

Referring again to FIG. 1, in some embodiments, the event-registration mechanism 6 is configured to detect one or more digital events involving the controller 10, such as, for example, receipt of a token, digital file, or other digital input at the controller 10. The event-registration mechanism 6 may be configured to record the digital event and/or generate a signal indicative of the digital event. For example, in some embodiments, the event-registration mechanism 6 is configured to detect communication between the controller 10 and a user device, such as user device 20a. The event-registration mechanism 6 identifies each communication and/or specific communication as an event.

In some embodiments, the controller 10 is in signal communication with at least one selectively-operated device 30a, 30b. Each of the selectively-operated devices 30a, 30b are configured to dispense one or more products and/or services. For example, in some embodiments, a selectively-operated device 30a includes vending equipment configured to dispense at least one physical product, for example, a vending machine configured to dispense one or more products. As another example, a selectively-operated device 30b is configured to provide a service, such as a washing machine, a car wash, etc. Each of the selectively-operated devices 30a, 30b can be configured to dispense any suitable combination of products and/or services. Although embodiments are discussed herein using specific examples, it will be appreciated that each of the selectively-operated devices 30a, 30b can be configured to dispense any suitable products, goods and/or services, and are within the scope of this disclosure.

In some embodiments, the controller 10 is configured to generate and transmit one or more control signals 34 to at least one selectively-operated device 30a, 30b. For example, in some embodiments, the controller 10 is configured to transmit a control signal 34 including at least one pulse signal. A pulse signal (or a combination of pulse signals) may be indicative of a detected event, such as, for example, indicative of a denomination of a unit of currency, a total value of currency, a number of payment objects detected (e.g., tokens, etc.), a digital payment and/or digital object received by the controller 10 and/or any other suitable event monitored by the event-registration mechanism 6. For example, in some instances, each of the generated pulse signals corresponds to a denomination of physical currency received at the event-registration mechanism 6. As another example, in some instances, one or more of the generated pulse signals correspond to a value of digital currency transmitted to the controller 10. The selectively-operated device 30a, 30b receives each of the transmitted pulse signals and treats the pulse signals identically to payment deposited directly with the selectively-operated device 30a, 30b. For example, in some embodiments, the selectively-operated device 30a, 30b authorizes one or more purchases, dispenses one or more products, and/or activates one or more services based on the value of the payment indicated by one or more pulse signals.

In some embodiments, the control signals 34 include one or more activation and/or control signals. For example, in some embodiments, controller 10 generates a signal configured to activate the selectively-operated device 30a, 30b to dispense one or more products or services. The controller 10 may generate an activation signal in response to a total value received at the event-registration mechanism 6 and/or a digital payment received at the controller 10. In some embodiments, the control signals 34 include one or more query signals configured to initiate a telemetry gathering-and-transmission process of the one or more selectively-operated devices 30a, 30b. For example, in some instances, the selectively-operated devices 30a, 30b receive a query signal and load telemetry data from a tangible, non-transitory memory module integrated therewith, as discussed in greater detail below. The loaded telemetry data is provided to the controller 10 in response to the query signal.

In some embodiments, each of the at least one selectively-operated devices 30a, 30b are configured to generate, store, and/or transmit telemetry data 32a to the controller 10. The telemetry data 32a can include any suitable data regarding the operation of the selectively-operated devices 30a, 30b. For example, in some embodiments, each of the selectively-operated devices 30a, 30b are configured to provide telemetry data including, but not limited to, an operational state of the selectively-operated device 30a, 30b, a quantity of product and/or services provided by the selectively-operated device 30a, 30b, availability of products and/or services from the selectively-operated device 30a, 30b, and/or any other suitable telemetry data. The telemetry data can be generated and transmitted to the controller 10 in response to one or more triggers. For example, telemetry data 32a can be generated and/or transmitted each time a status of the selectively-operated device 30a, 30b changes, such as when a product or service is dispensed. As another example, telemetry data 32a can be generated and/or transmitted each time the operational status of a selectively-operated device 30a, 30b changes. As yet another example, telemetry data 32a may be generated and/or transmitted in response to a control signal 34, such as a query signal, received from the controller 10. Telemetry data 32a may be generated automatically by the selectively-operated device 30a, 30b in response to a trigger, at one or more intervals, and/or in response to a signal (such as a query signal) from the controller 10.

In some embodiments, each selectively-operated device 30a, 30b is configured to store telemetry data 32a in one or more tangible, non-transitory memory modules. For example, each selectively-operated device 30a, 30b may include one or more circuits such as a telemetry circuit 36 configured to generate and/or collect telemetry data 32a including, but not limited to, an operational state, a quantity of product and/or service, an inventory indication, and/or any other suitable telemetry data. The collected telemetry data 32a is processed and stored, for example by a processor integral with each of the selectively-operated devices 30a, 30b, in a tangible, non-transitory memory module.

In some embodiments, each selectively-operated device 30a, 30b is configured to generate and transmit telemetry data 32a directly to controller 10 without storing and/or processing telemetry data. The selectively-operated device 30a, 30b may include one or more telemetry circuits 36 configured to generate and transmit telemetry data 32a to the controller 10, for example, via a wired and/or wireless connection. Received telemetry data may be stored by the controller 10, for example, in memory module 18 as shown in FIG. 2, transmitted via the communications module 14, and/or otherwise processed and/or manipulated by processor 12.

In some embodiments, the controller 10 is configured to generate, store, and/or transmit telemetry data 32b internally. The telemetry data 32b can include any suitable data regarding the operation of the system 2. For example, in some embodiments, the controller 10 is configured to generate and/or store telemetry data including, but not limited to, an operational state of the system 2, a number of events detected by the event-registration mechanism 6, types of events detected by the event-registration mechanism 6, parameters of the event detected (e.g., size, duration, denomination, time, etc.), and/or any other suitable telemetry data. The telemetry data 32b can be generated in response to one or more triggers. For example, telemetry data 32*b* can be generated each time an event is detected by the event-registration mechanism 6. As another example, telemetry data 32*b* can be generated each time the operational status of a system 2 changes. As yet another example, telemetry data 32*b* may be generated in response to a query signal received at the controller 10. Telemetry data 32*b* may be generated automatically by the controller 10 in response to a trigger, at one or more intervals, and/or in response to a signal (such as a query signal).

In some embodiments, the system 2 includes a user device 20*a* configured to transmit an interrogation signal 38 to the controller 10. The user device 20*a* can by any suitable computing device, such as a personal computer, a laptop computer, a tablet computer, a notebook computer, a handheld computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device, and any other type of computing device. The user device 20*a* may be configured to receive input from a user, transmit and/or receive one or more signals to/from the controller 10, and/or perform one or more processes to interrogate the controller 10 and receive telemetry data from the controller 10.

In some embodiments, the user device 20*a* generates and transmits an interrogation signal 38, such as a wireless interrogation signal, to the controller 10. The controller 10 receives the interrogation signal 38 and generates a response signal 39 including telemetry data 32, for example, telemetry data 32*a* collected from one or more selectively-operated devices 30*a*, 30*b* in signal communication with the controller 10 and/or telemetry data 32*b* generated by the controller 10. For example, in some embodiments, the controller 10 generates a query signal for each of the selectively-operated devices 30*a*, 30*b* in signal communication with the controller 10. The controller 10 receives telemetry data 32*a* from each of the selectively-operated devices 30*a*, 30*b* in response to the control signal 34 (e.g., query signal). As another example, in some embodiments, the controller 10 is configured to load telemetry data from an internal storage in response to the interrogation signal 38. The controller 10 may generate and transmit a single response signal 39 including telemetry data 32 received from all of the selectively-operated devices 30*a*, 30*b* and/or generated by the controller 10 to the user device 20*a* and/or may generate multiple response signals 39, each including telemetry data 32*a*, 32*b* from one of the selectively-operated devices 30*a*, 30*b* and/or the controller 10.

In some embodiments, user device 20*b* is configured to generate and transmit one or more configuration signals 33 to controller 10. For example, in some embodiments, user device 20*b* is configured to generate one or more configuration signals to set one or more configurable operations of controller 10, the selectively-operated devices 30*a*, 30*b*, the event-registration mechanism 6, and/or any other portion of system 2. The user device 20*b* may establish a command-control connection with the controller 10, which may generate a status signal indicative of one or more current settings of the controller 10, one or more selectively-operated devices 30*a*, 30*b*, and/or any other suitable system. The current settings and/or potential settings of the controller 10, one or more selectively-operated devices 30*a*, 30*b*, and/or other devices in system 2 are displayed on the user device 20*b*, for example, in a graphical user interface (GUI) generated by the user device 20*b* on a display screen or other output of the user device 20*b*.

A user may provide one or more inputs to the user device 20*b* to change one or more of settings of the controller 10, selectively-operated devices 30*a*, 30*b*, and/or any other suitable portion of the system 2. For example, in some embodiments, user device 20*b* displays a GUI including one or more setting options for the controller 10, the selectively-operated devices 30*a*, 30*b*, and/or any other suitable portion of the system 2. A user may provide input to the user device 20*b* (for example, through a touch screen, peripheral device, or other input device) to change one or more of the displayed settings. After receiving one or more changes, the user device 20*b* may generate and transmit a configuration signal to the controller 10. The controller 10 may initiate one or more processes to update the corresponding setting of the controller 10, selectively-operated devices 30*a*, 30*b*, event-registration mechanism 6, and/or any other suitable portion of system 2. For example, in some embodiments, the processor 12 may update one or more settings stored in memory module 18 for the controller 10, such as, for example, instructions and/or procedures for telemetry data gathering and storage, payment authorization, token authorization, etc. As another example, in some embodiments, the controller 10 may generate one or more control signals 34 configured to update one or more settings of the selectively-operated devices 30*a*, 30*b* in signal communication with the controller 10, for example, updating a cost associated with one or more products and/or services, updating telemetry data generation and transmission, updating device capabilities, and/or any other suitable settings or configurations.

In various embodiments, a user device 20*a*, 20*b* and/or a controller 10 may be in signal communication with a remote server 40 over network 42. The remote server 40 may be configured to receive and/or transmit data to and/or from the user device 20*a*, 20*b* and/or the controller 10. For example, in some embodiments, the remote server 40 is configured to receive telemetry data 32 from the controller 10 and/or the user device 20*a*, 20*b*. The remote server 40 may be configured to store and/or process received telemetry data 32 as discussed herein. In some embodiments, the remote server 40 may be configured to provide updated data, such as updated token data 11*b*, to the user device 20*a*, 20*b* and/or the controller 10. Although specific embodiments are discussed herein, it will be appreciated that the remote server 40 can be configured to provide any suitable information and/or configuration settings over the network 42.

In some embodiments, the controller 10 is configured to receive a signal from the event-registration mechanism 6 indicative of one or more events and generate an output in response to the received signal. For example, in some embodiments, the event-registration mechanism 6 is configured to monitor movement of persons and/or objects along a predetermined path 70. For each person and/or object moving along the path 70, an owner of the controller 10 is contractually obligated to provide payment to a third-party. For example, in some embodiments, the path 70 may be associated with entry to a location containing vendor equipment, and for each person entering the location, the vendor collects a fee from the location owner. As another example, in some embodiments, the event-registration mechanism 6 is configured to monitor movement of vehicles into and/or out of a lot containing parking spaces for the vehicles that is owned by a first entity and operated by a second entity. Although specific embodiments are discussed herein, it will be appreciated that any suitable event can be monitored by the event-registration mechanism 6.

In some embodiments, the controller 10 monitors each event and stores the monitored data (e.g., telemetry data 32b) in a memory module 18. The telemetry data 32b can be used to calculate payment amounts based on predetermined formulas at the controller 10 and/or can be provided to a user device 20a in response to an interrogation signal. In some embodiments, the controller 10 is configured to generate a digital payment, such as a digital token, and provide the digital payment to the user device 20a in response to an interrogation signal and/or other communication from the user device 20a.

As illustrated in FIG. 2, in some embodiments, the controller 10 includes a processor 12 electrically coupled to a communications module 14. The communications module 14 is configured to receive one or more signals from the event-registration mechanism 6, for example, signal 26. The communications module 14 can include a wired 16a and/or a wireless 16b communication system configured to transmit and/or receive signals over one or more wired and/or wireless protocols, channels, etc. In some embodiments, the communications module 14 includes multiple modules 16a, 16b each configured to transmit and/or receive one or more wired and/or wireless signals. For example, in some embodiments, the communications module 14 includes at least one wireless communication module 16b configured to provide wireless communication utilizing a Bluetooth standard, such as Bluetooth and/or Bluetooth Low Energy (BLE), although it will be appreciated that any suitable wireless protocol (e.g., IEEE 802.11), can be used, as discussed in greater detail below.

In some embodiments, the processor 12 is configured to receive a signal indicative of an event monitored by the event-registration mechanism 6, for example, via the communication module 14. The processor 12 may be further configured to store telemetry data 32b related to the detected event in a memory module 18, which may include one or more tangible, non-transitory, non-volatile memory modules. For example, in various embodiments, the processor 12 is configured to generate and/or store telemetry data 32 including, but not limited to, information related to currency quantities and/or denominations received by the event-registration mechanism 6, objects received by the event-registration mechanism 6, movement of persons and/or objects through the event-registration mechanism 6, and/or any other suitable telemetry data.

In some embodiments, the memory module 18 stores instructions for programming the processor 12 to receive one or more signals from the communications module 14 and perform one or more processes in response to the received signal. For example, in various embodiments, the processor 12 may be programmed to receive a signal from the event-registration mechanism 6 and generate one or more control signals 34 for a selectively-operated device 30a, 30b, receive digital payment from a user device 20a, 20b and generate one or more control signals for the selectively-operated device 30a, 30b. As another example, in some embodiments, the processor 12 may be programmed to receive a telemetry request from a user device 20a, 20b and generate and transmit a signal responsive to the telemetry request, each of which is discussed in greater detail below.

In some embodiments, the processor 12 is configured to receive a signal from the event-registration mechanism 6 and generate telemetry data 32b. For example, in some embodiments, the communications module 14 receives a signal indicative of a detected event (for example, movement of persons and/or objects along a predetermined path) and passes the signal to the processor 12. The processor 12 is configured to generate telemetry data 32b indicative of the detected event, the type of event, the number of events, etc., and store the telemetry data 32b in a memory module for later inquiries by a user device 20a.

In some embodiments, the controller 10 includes a power supply 21. The power supply 21 may be configured to receive a power signal 28 from a remote source and convert the power signal 28 to an internal voltage and/or current useable by one or more elements of the controller 10. In other embodiments, the power supply 21 is a self-contained power source, such as a battery, solar cell, and/or other power source. In some embodiments, the controller 10 can include an output relay 22 configured to generate one or more pulse signals, as discussed in greater detail below. Although the output relay 22 is illustrated as an independent component, it will be appreciated that the output relay 22 can be integrated into and/or replaced by the communications module 14, and/or any other suitable component of the controller 10.

In some embodiments, the controller 10 includes a status indicator 23 configured to display a current status of one or more elements of the system 2. For example, in various embodiments, the status indicator 23 can include a light-emitting diode (LED), screen, or other output configured to display a visual indication of the status of one or more elements of the system 2. In some embodiments, the status indicator 23 is configured to provide a first status indication (such as a first colored light) when the status of all elements of the system 2 (or a subset thereof) is positive (i.e., all elements working as intended) and a second status indication (such as a second colored light) when the status of any one element of the system 2 is negative (i.e., not working as intended). Although embodiments are discussed herein including a visual status indicator 23, it will be appreciated that the status indictor 23 can provide any suitable indication, such as a visual indication (such as a light, screen, etc.), an audible indication (such as a siren, buzzer, etc.), or a digital indication (such as a digital message reviewable by a user device 20a, etc.).

In some embodiments, the controller 10 includes a physical input 25 configured to activate one or more predetermined processes. The input 25 can include any suitable physical input, such as, for example, a button, a switch, a dial, etc. The input 25 may be configured to activate any suitable process, such as, for example, a programmable/configuration process configured to transmit and/or receive configuration settings to a user device 20a in signal communication with the controller 10.

Figure 3:
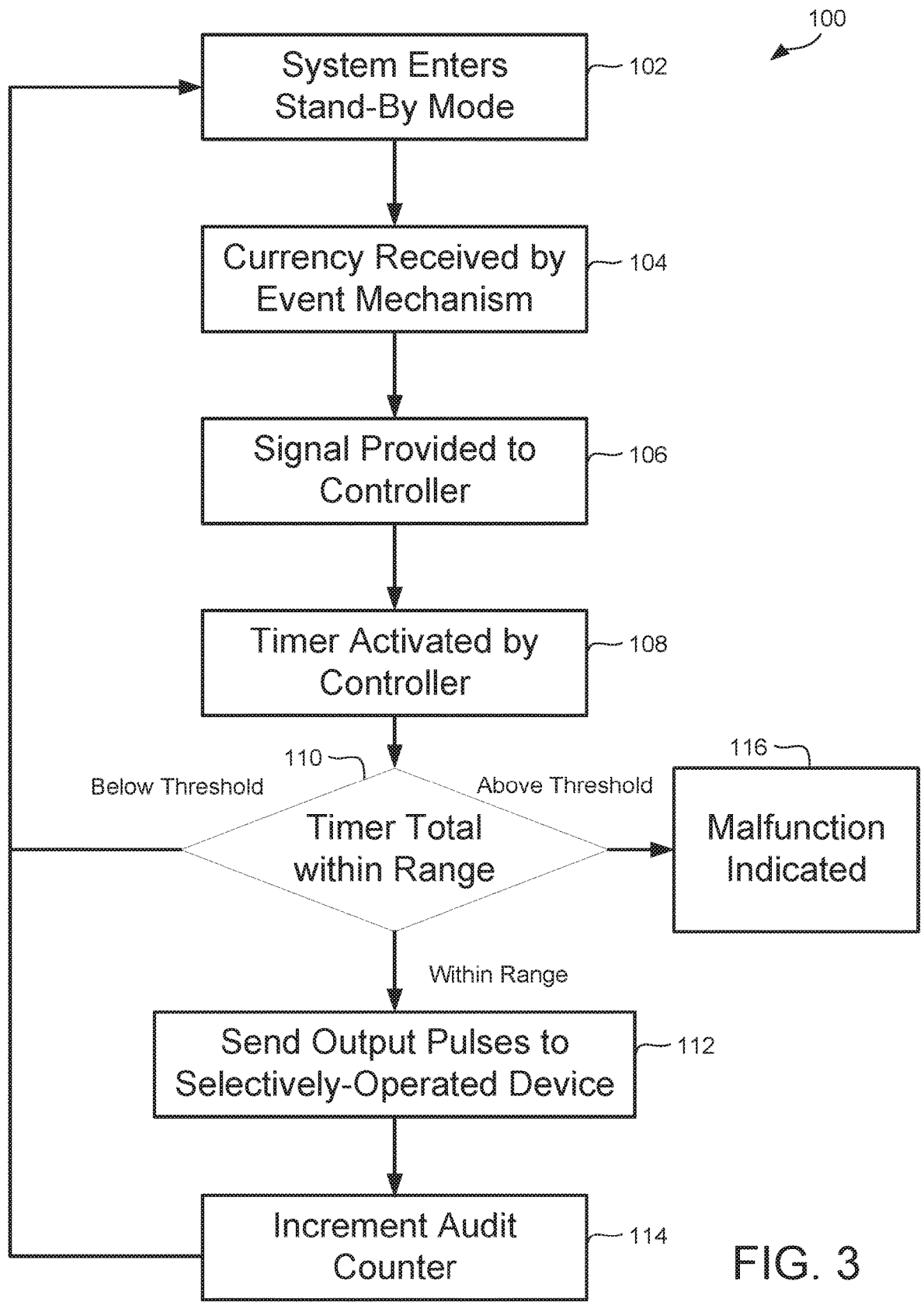
FIG. 3 illustrates a process of receiving physical currency and authorizing one or more transactions including at least one selectively-operated device, in accordance with some embodiments.

FIG. 3 illustrates a process 100 of receiving physical currency and authorizing one or more transactions involving a selectively-operated machine 30a, 30b, in accordance with some embodiments. At step 102, an event-registration mechanism 6 enters stand-by mode and waits to detect an event corresponding to receipt of physical currency (for example, physical fiat currency, currency substitutes (such as tokens, etc.), payment cards, payment chips, and/or any other suitable physical payment). At step 104, physical currency is received by the event-registration mechanism 6, for example, through a slot defined in a housing of the event-registration mechanism 6.

At step 106, a signal is generated by the event-registration mechanism 6 and transmitted to the controller 10. The controller 10 may be contained in the same housing as the event-registration mechanism 6 and/or may be remote from the event-registration mechanism 6. The signal is indicative of the denomination and/or value of the deposited physical currency. For example, in some instances, the event-registration mechanism 6 generates a signal (such as a pulse signal) indicative of a denomination of physical currency received therein. As another example, in some instances, the event-registration mechanism 6 receives a token and generates a signal indicative of an assigned currency value of the token. In some instances, the signal is generated by one or more sensors, such as an optical sensor, positioned at or adjacent to the opening in the event-registration mechanism 6. Although embodiments are discussed herein using an optical sensor, it will be appreciated that any suitable sensor may be used to detect the presence, denomination, and/or acceptability of physical currency deposited in a slot or opening of the event-registration mechanism 6.

At step 108, the controller 10 activates a timer in response to the received signal. For example, in some instances, the controller 10 includes a timing circuit 13 that activates when the signal is received from the event-registration mechanism 6. The timing circuit 13 may include a timer formed integrally with and/or implemented by the processor 12, a timing circuit 13 housed in or on the controller 10, and/or any suitable commonly housed timer. In other embodiments, the controller 10 may be configured to activate a separate timing circuit 13, for example, a timing circuit positioned remotely from and in signal communication with the controller 10. In some instances, the timing circuit 13 may be configured to maintain a count (beginning at zero or some other starting value) of elapsed time from receipt of the signal from event-registration mechanism 6. For example, in some instances, each activation of the timing circuit 13 causes the timing circuit 13 to begin counting up from zero until an additional signal and/or other trigger stops and/or resets the timing circuit 13. In other embodiments, the timing circuit 13 is configured to count down from a predetermined value (such as a predetermined value corresponding to a time limit). For example, in some instances, each activation of the timing circuit 13 causes the timer to begin counting down from the predetermined value until an additional signal is received and/or the timer reaches a value of zero (or other lower threshold value). Although specific embodiments are discussed herein, it will be appreciated that any suitable timing circuit or counter circuit can be implemented.

At step 110, the controller 10 determines whether the elapsed time from activation of the timing circuit 13 in step 108 is within a predetermined time limit. In some embodiments, the controller 10 may pause or stop the timing circuit 13 and receive an elapsed time directly from the timing circuit 13. In other embodiments, the controller 10 may request a current time or timing information from the timing circuit 13 and calculate elapsed time based on the received timing information. The controller 10 may determine if the elapsed time is below a first predetermined value (lower threshold value), above a second predetermined value (upper threshold value), or between a lower threshold value and an upper threshold value.

If the elapsed time from activation of the timing circuit 13 is below the lower threshold, the controller 10 ignores the initiated signal and determines that no currency (or no suitable currency) was input. The process 100 proceeds back to step 102 and the event-registration mechanism 6 enters a stand-by mode. If the elapsed time of the timing circuit 13 is above the upper threshold value, the controller 10 proceeds to step 116 and identifies a malfunction in the event-registration mechanism 6. For example, in various embodiments, the controller 10 may be configured to activate a status indicator 23 to provide a visual indication (such as a light, screen, etc.), an audible indication (such as a siren, buzzer, etc.), or a digital indication (such as a digital message reviewable by an audit mechanism, etc.) of a malfunction to alert a user, owner, and/or other entity of the malfunction.

In some embodiments, if the elapsed time from activation of the timing circuit 13 is between the lower threshold and the upper threshold, the processor 12 determines that the deposited item is an acceptable form of physical currency. For example, in some embodiments, an elapsed time between a lower threshold and an upper threshold is indicative of a value of physical currency deposited in a slot, such as a first range for physical currency having a first value, a second range for physical currency having a second value, etc. As another example, in some embodiments, an elapsed time between a lower threshold and an upper threshold is indicative of an acceptable form of currency and the value of the deposited currency is fixed and/or determined using one or more additional sensors, sensor data, and/or other systems.

At step 112, the controller 10 generates and outputs a plurality of output pulses to one or more of the selectively-operated devices 30a, 30b. The plurality of output pulses are indicative of a quantity, type, and/or total value of physical currency deposited at the event-registration mechanism 6. For example, in some embodiments, a predetermined combination of output pulses corresponds to one or more acceptable forms of physical currency, such as a combination of output pulses corresponding to each of an available coin in a predetermined currency (e.g., pennies, nickels, dimes, quarters, dollar coins for U.S. dollars; one penny, two pence, five pence, ten pence, twenty pence, twenty-five pence, fifty pence, one pound, two pounds for pounds Sterling; one cent, two cents, five cents, ten cents, twenty cents, 50 cents, €1 and €2 for the Euro, etc.). As another example, in some embodiments, the combination of the plurality of pulses is indicative of a total value of all physical currency deposited at the event-registration mechanism 6.

At step 114, an audit counter is incremented. The audit counter maintains a record of each payment made and/or currency deposited with the event-registration mechanism 6 and provided to the selectively-operated device 30a. For example, in some embodiments, the audit counter is maintained within the event-registration mechanism 6 and is updated each time the controller 10 indicates that acceptable physical currency has been deposited, for example, based on a time measurement performed by the timing circuit 13 in step 110. As another example, in some embodiments, the audit counter is maintained within the selectively-operated device 30a and is updated each time the controller 10 generates and transmits one or more pulse signals indicative of a payment amount to the selectively-operated device 30a. As yet another example, in some embodiments, the controller 10 maintains an audit counter within a tangible, non-transitory memory, such as memory module 18. The controller 10 is configured to update the audit counter based on physical currency received at the event-registration mechanism 6 and/or output pulse signals generated for the one or more selectively-operated devices 30a, 30b. After incrementing the audit counter, the method 100 returns to step 102 and the event-registration mechanism 6 enters stand-by mode.

Figure 4:
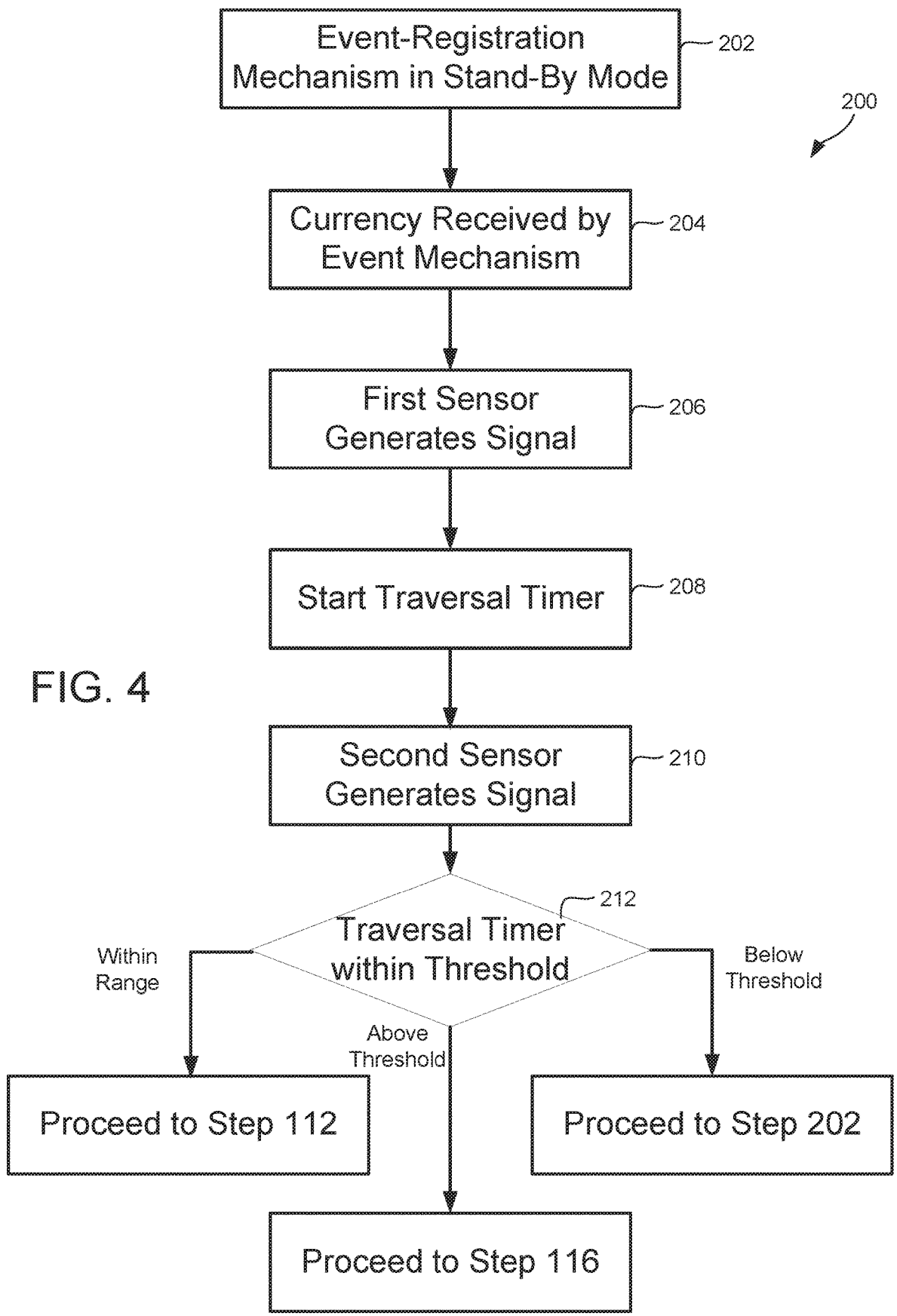
FIG. 4 illustrates a process of verifying a physical currency payment received at an event-registration mechanism, in accordance with some embodiments.

FIG. 4 illustrates a process 200 of verifying a physical currency payment received at the event-registration mechanism 6, in accordance with some embodiments. At step 202, the event-registration mechanism 6 enters and/or is in a stand-by mode. At step 204, physical currency is received by the event-registration mechanism 6. For example, in some embodiments, physical currency is inserted into one or more slots or openings defined in the event-registration mechanism 6. The physical currency can include any suitable denomination and/or type of physical currency, such as coins, bills (e.g., paper), tokens, and/or any other suitable physical currency.

At step 206, a first sensor 8*a* generates a first signal. The first sensor 8*a* can include any suitable sensor, such as an optical sensor, an ultrasonic sensor, a passive infrared sensor, an active infrared sensor, a microwave sensor, a tomographic sensor, a video sensor (such as a video recorder in conjunction with one or more image processing systems), and/or any other suitable sensor. The first sensor 8*a* is configured to generate a signal when a unit of physical currency is received within the event-registration mechanism 6. For example, in some instances, the first sensor 8*a* is positioned at and/or adjacent to a slot or other opening configured to receive physical currency therein. When physical currency is deposited within the slot and/or other opening, the first sensor 8*a* detects the physical currency and generates a signal. The signal may be provided to a timing circuit 13 in signal communication and/or formed integrally with the event-registration mechanism 6, a controller 10, and/or a selectively-operated device 30*a*, 30*b*.

At step 208, the timing circuit 13 starts a currency traversal timer and at step 210 a second sensor 8*b* generates a second signal configured to stop or pause the timing circuit 13. The timing circuit 13 is configured to measure the time that a unit of physical currency takes to travel from the first sensor 8*a* to a second sensor 8*b*. For example, as illustrated in FIG. 1A, a first sensor 8*a* may be located at a first position 74*a* on a predetermined path 70 associated with the event-registration mechanism 6 and a second sensor 8*b* may be positioned at a second position 74*b* on the predetermined path 70. A second sensor 8*b* may be positioned a predetermined distance equal to or greater than a maximum diameter of a currency unit that is acceptable to the event-registration mechanism 6. In some embodiments, the second sensor 8*b* may be positioned at or near a branching path of the predetermined path 70. In some embodiments, the predetermined path 70 is a currency-traversal path including a first corresponding to acceptance of the physical currency (i.e., routing of the physical currency to an internal storage container) and a second branch corresponding to rejection of the physical currency (i.e., routing to a return slot or other coin return).

At step 212, an elapsed time of the timing circuit 13 is calculated to determine time of travel of the currency through the predetermined path. For example, in various embodiments, the controller 10 (such as processor 12) may determine if the elapsed time of the timing circuit 13 is below a first predetermined value (lower threshold value), above a second predetermined value (upper threshold value), or between a lower threshold value and an upper threshold value. In some embodiments, if the elapsed time of the timing circuit 13 is below the lower threshold, the controller 10 ignores the initiated signal and determines that no currency (or no suitable currency) was input. The method 200 proceeds to step 202 and the input currency (or non-currency input) is ignored. If the elapsed time of the timing circuit 13 is above the upper threshold value, the process 200 proceeds to step 116 of method 100 discussed above and identifies a malfunction in the currency mechanism and generates a malfunction indication. For example, in various embodiments, the controller 10 may be configured to activate a visual indication (such as a light, screen, etc.), an audible indication (such as a siren, buzzer, etc.), or a digital indication (such as a digital message reviewable by an audit mechanism, etc.).

In some embodiments, if the elapsed time of the timing circuit 13 is between the lower threshold and the upper threshold, the event-registration mechanism 6 and/or the controller 10 determines that the deposited item is an acceptable form of physical currency. For example, in some embodiments, an elapsed time between a lower threshold and an upper threshold is indicative of a value of physical currency deposited in the slot, such as a first range for physical currency having a first value, a second range for physical currency having a second value, etc. As another example, in some embodiments, an elapsed time between a lower threshold and an upper threshold is indicative of an acceptable form of currency having a fixed value and/or a value determined using one or more additional sensors, sensor data, and/or other suitable systems. If the elapsed time of the traversal timer is between the lower threshold and the upper threshold, the process 200 proceeds to step 112 of method 100 discussed above.

Figure 5:
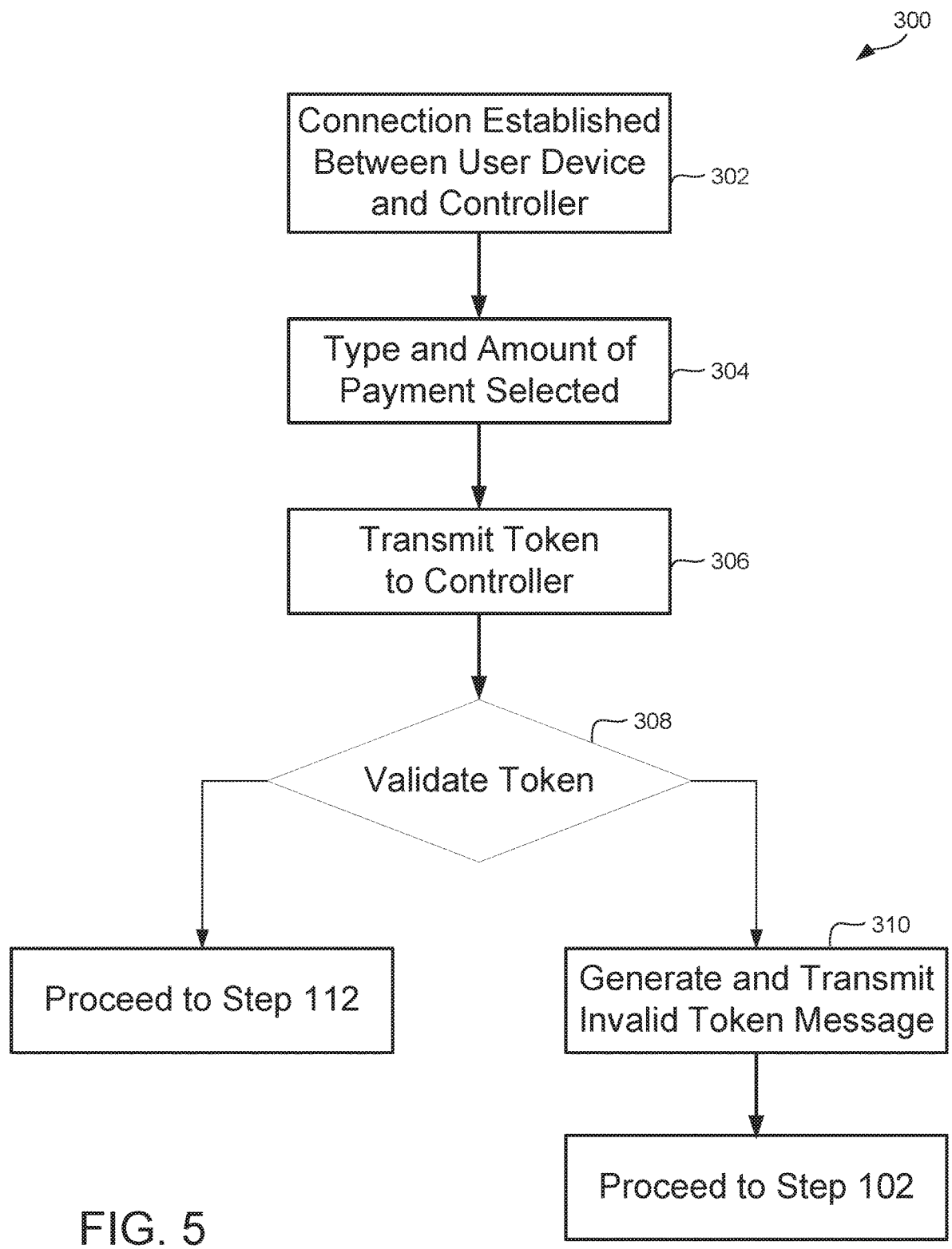
FIG. 5 illustrates a process of receiving a digital payment for one or more products or services provided by a selectively-operated device, in accordance with some embodiments.

FIG. 5 is a flowchart illustrating a process 300 of receiving a digital payment at a controller 10 from a user device 20*b*, in accordance with some embodiments. At step 302, a connection is established between the user device 20*b* and the controller 10. The connection can be established over any suitable communication channel, such as a wireless communication channel, such as a short-range communication channel (e.g., Bluetooth, Bluetooth Low Energy, etc.), a wired communication channel, and/or any other suitable communication channel. For example, in some embodiments, the controller 10 and the user device 20*b* each include a Bluetooth module configured to facilitate and provide a Bluetooth or Bluetooth Low Energy (BLE) connection between the controller 10 and the user device 20*b*. Although step 302 is illustrated as occurring before subsequent steps, it will be appreciated that the communications channel can be established after one or more of step 304 or step 306, each discussed in greater detail below.

At step 304, a user interacting with the user device 20*b* selects a type and an amount of payment to be provided to the controller 10 and/or the selectively-operated devices 30*a*, 30*b*. A user can interact with one or more applications running on the user device 20*b*, for example, through a GUI, input peripheral, and/or other input device. In some embodiments, a user can select a payment type, such as a source of payment, a currency of payment, and/or any other suitable type of payment from a list of payments provided by the application. For example, in some embodiments, a user can select a source of payment including a credit card, a digital wallet, a digital token, and/or any other acceptable form or type of payment.

After and/or simultaneously with selecting the type of payment, a user may further select an amount of the digital payment to be provided to the controller 10. For example, in some embodiments, a user may select a payment amount equal to or greater than a value for a product or service available from the selectively-operated devices 30*a*, 30*b*. In some embodiments, a user may identify a cost of one or more products and/or services based on a display provided on the controller 10 and/or the selectively-operated devices 30*a*, 30*b*. In other embodiments, a user may identify a cost of one or more products and/or services based on data transmitted from the controller 10 over the established data communication channel, for example, a Bluetooth communication channel. For example, the controller 10 may be configured to provide pricing information for one or more services and/or products available from connected selectively-operated devices 30a, 30b to the user device 20b for display to the user, although it will be appreciated that the user device 20b and/or the user can establish a cost of one or more services and/or products using any suitable method.

At step 306, the user device 20b transmits a token to the controller 10. In some embodiments, the token represents a predetermined value in a predetermined currency. For example, a token may be representative of a predetermined value, such as $0.25, $0.50, $1.00, $2.00, etc. The token may be transmitted using any suitable communications channel, such as a wireless communications channel established between the user device 20b and the controller 10.

At step 308, the controller 10 determines whether the token is a valid payment token. For example, in some embodiments, each token generated by and/or stored by the user device 20b includes a unique token identifier and/or validation value. The controller 10 includes a list of valid token identifiers and/or validation values, for example, as maintained by a memory module 18. The processor 12 is configured to extract a token identifier and/or validation value from a received token and compare the extracted value to the stored list. If the identifier and/or validation value of the received token matches a stored identifier and/or validation value, the processor 12 determines that the token is a valid token, and the process 300 proceeds to step 112 of process 100 to authorize activation of a currency-operated machine 30a, 30b. If the identifier and/or validation value of the received token does not match a stored value, the processor 12 determines that the token is not valid and, at step 310, an invalid payment message is generated by the controller 10 and transmitted to the user device 20b. The process 300 proceeds to step 102 and places the system 2 in stand-by mode. A user may provide an alternative payment such as an alternative digital token and/or physical currency.

Figure 6:
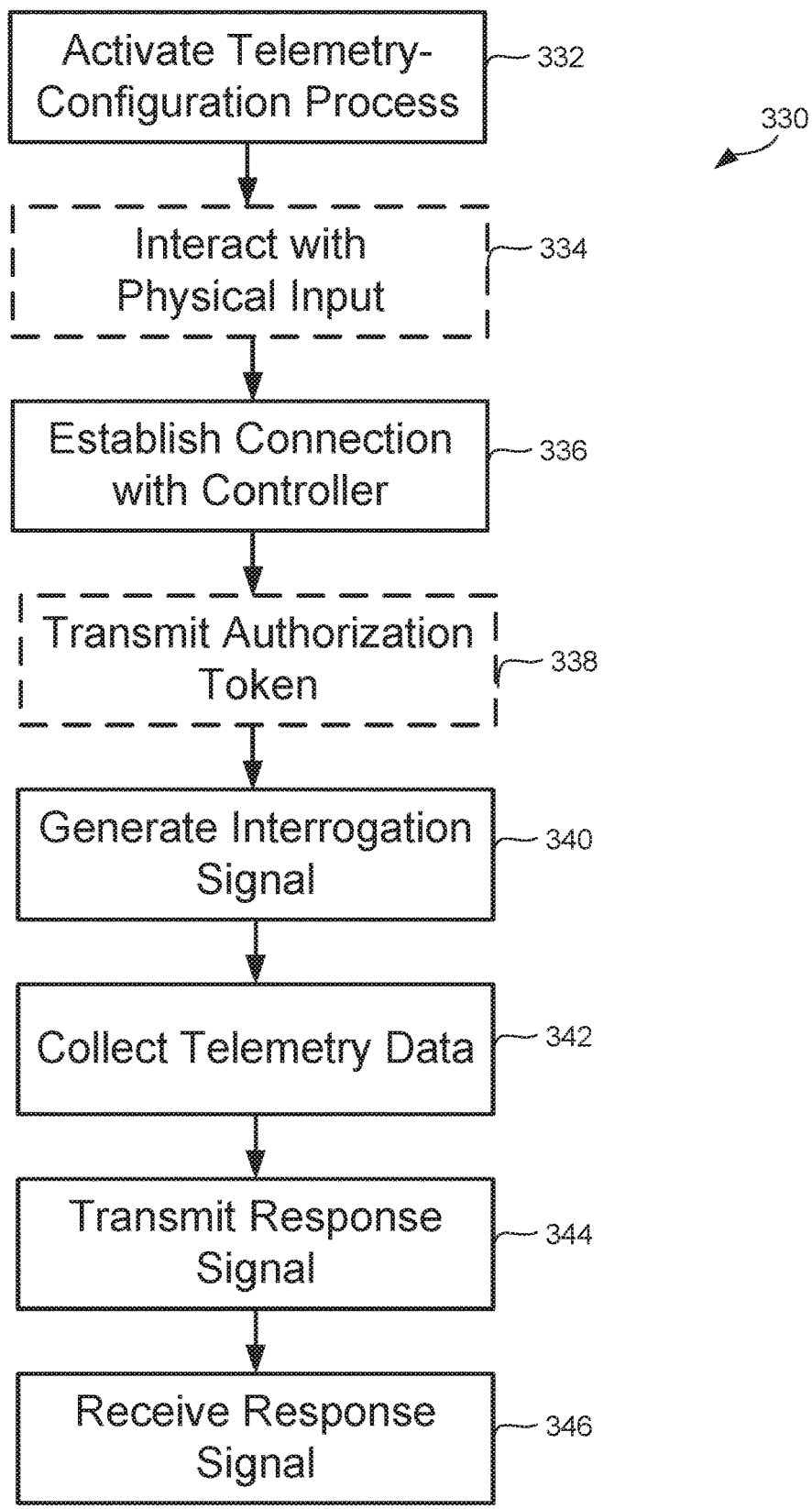
FIG. 6 illustrates a process of obtaining telemetry data from a controller using a user device, in accordance with some embodiments.

FIG. 6 illustrates a process 330 of obtaining telemetry data from a controller 10 using a user device 20a, in accordance with some embodiments. At step 332, a user interacts with a user device 20a to activate an audit process of the controller 10 and/or one or more selectively-operated devices 30a, 30b in signal communication with the controller 10. A user may interact with the user device 20a using any suitable input, such as a GUI, a peripheral, and/or any other suitable input device. In some instances, the user device 20a activates an audit process by transmitting a signal to the controller 10 before, during, and/or after establishing a communication connection with the controller 10, as discussed in greater detail below with respect to step 334.

In some embodiments, a user initiates an audit process at optional step 334 by interacting with a physical input 25 coupled to and/or formed integrally with the controller 10. The controller 10 is transitioned to a configuration/telemetry mode by the physical input 25. After transitioning to the configuration/telemetry mode, the controller 10 attempts to establish a connection with one or more user devices 20a located within a predetermined range of the controller 10.

At step 336, a connection is established between the user device 20a and the controller 10. The connection can be established over any suitable communication channel, such as a wireless communication channel, such as a short-range communication channel (e.g., Bluetooth, Bluetooth Low Energy, etc.), a wired communication channel, and/or any other suitable communication channel. For example, in some embodiments, the controller 10 and the user device 20a each include a Bluetooth module configured to facilitate and provide a Bluetooth or Bluetooth Low Energy (BLE) connection between the controller 10 and the user device 20a.

At optional step 338, the user device 20a transmits an authorization token to the controller 10. The controller 10 receives the authorization token and validates the authorization token. For example, in some embodiments, the controller 10 is configured to extract a validation value from the authorization token. The validation value is compared to a list of known validation values maintained by the controller 10. If the extracted validation value matches a stored value, the controller 10 verifies the authorization token and establishes a connection with the user device 20a to allow the user device 20a to interact with the controller 10. Although embodiments are illustrated having separate connection, verification, and interrogation steps, steps 334-338 (or any combination thereof) can be combined into a single step in other embodiments.

At step 340, the user device 20a generates and transmits an interrogation signal to the controller 10. The interrogation signal includes a request for at least a portion of telemetry data related to one or more selectively-operated devices 30a, 30b and/or the controller 10. For example, in some instances, the interrogation signal includes a request for telemetry data related to all selectively-operated devices 30a, 30b in signal communication with the controller 10. In other embodiments, the interrogation signal includes a request for telemetry data related to one or more selected selectively-operated devices 30a, 30b in signal communication with the controller 10. As another example, in some embodiments, the interrogation signal includes a request for telemetry data stored by the controller 10 and related to operation of the event-registration mechanism 6. A user may select devices for interrogation using, for example, an input of the user device 20a prior to transmission of the interrogation signal.

At step 342, the controller 10 receives the interrogation signal and collects telemetry data 32. For example, in some embodiments, the controller 10 generates and transmits a control signal 34, such as a query signal, to one or more of the selectively-operated devices 30a, 30b, which collect and transmit telemetry data 32a to the controller 10 in response to the query signal. In some embodiments, the controller 10 is configured to retrieve stored telemetry data 32a, 32b from a memory module in response to the interrogation signal from the user device 20a.

After collecting and/or loading the telemetry data 32, the controller 10 generates and transmits a response signal to the user device 20a at step 344. The response signal includes the collected telemetry data 32 (whether loaded from memory, such as memory module 18 and/or generated in response to a query signal). In some embodiments, the response signal is transmitted over the communications channel established between the user device 20a and the controller 10. In other embodiments, the response signal may be transmitted over a separate communications channel established between the user device 20a and the controller 10, for example, a second Bluetooth or BLE communications channel.

At step 346, the user device 20a receives the response signal from the controller 10. The user device 20a may store, display, and/or otherwise process the telemetry data 32 contained in the response signal. For example, in some embodiments, the user device 20a displays the received telemetry data 32 to a user (e.g., through a GUI). As another example, in some embodiments, the user device 20a is configured to store the received telemetry data 32 in a memory unit formed integrally with and/or in signal communication with the user device 20. Although specific embodiments are discussed herein, the user device 20a can be configured to perform any suitable operations on received telemetry data in other embodiments.

Figure 7:
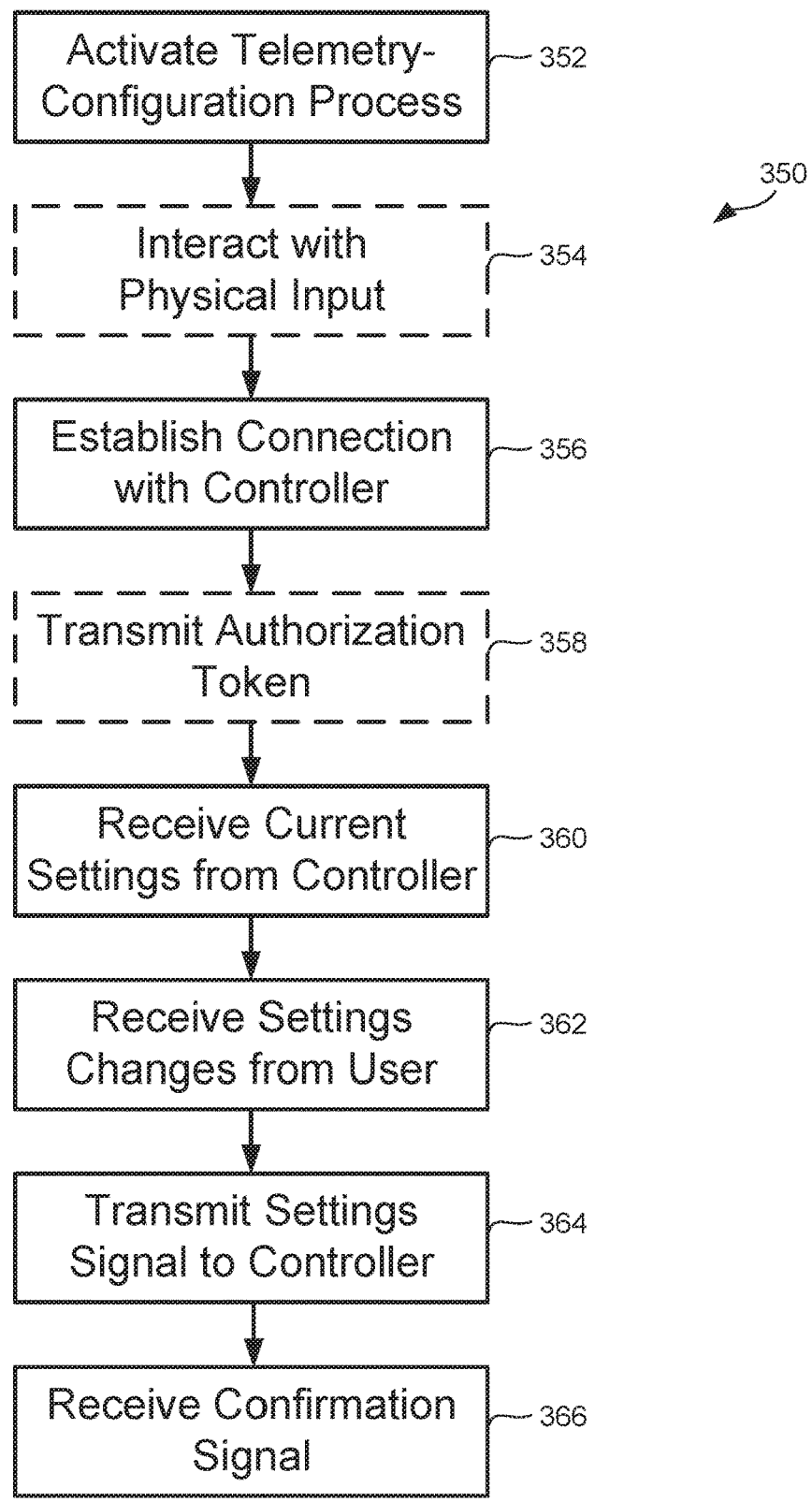
FIG. 7 illustrates a process of reviewing configuring one or more settings of a controller and/or a selectively-operated device, in accordance with some embodiments.

FIG. 7 illustrates a process 350 of configuring one or more settings of a controller 10, an event-registration mechanism 6, a selectively-operated device 30a, 30b, and/or any other suitable portion of system 2, in accordance with some embodiments. For example, in some embodiments, the controller 10 includes a plurality of programmable settings for the controller 10, the event-registration mechanism 6, the selectively-operated devices 30a, 30b and/or any other suitable portion of the system 2. The settings of the controller 10 may be wirelessly programmed by a user device 20a. In some embodiments, the user device 20a transmits one or more settings updates and/or changes in conjunction with a security token. The controller 10 is configured to validate the token and, if the validation is successful, apply the setting changes and/or updates included with the token. In some embodiments, a user device 20a can connect to multiple controllers 10 and/or multiple payment-operated devices 30a, 30b to update settings for each connected controller 10 and/or device 30a, 30b. The user device 20a can connect to multiple controllers 10 and/or devices 30a, 30b in serial and/or parallel. In some embodiment, settings include multiple categories of settings, such as user settings, factory settings, etc. that each require different authorization and/or access levels for updating and/or changing.

Steps 352-358 of process 350 are the same as steps 332-338, respectively, discussed above with respect to FIG. 6, and the description thereof is not repeated herein. Although embodiments are illustrated having distinct steps 352-358, in other embodiments, the steps 352-358 (or any combination thereof) can be combined into a single step performed by the controller 10 and/or the user device 20a.

At step 360, the user device 20a receives a signal indicative of the current configuration settings of the controller 10, the one or more selectively-operated devices 30a, 30b, the event-registration mechanism 6, and/or any other suitable portion of the system 2 from the controller 10. The controller 10 may generate and transmit the current configuration settings signal in response to a configuration signal 33 from the user device 20a and/or automatically when a communication channel is established between the user device 20a and the controller 10. In some embodiments, the controller 10 is configured to transmit all current settings and/or configurations of the system 2, but in other embodiments, the controller 10 can transmit a predetermined number and/or selection of settings and/or configurations to the user device 20a.

At step 362, the user device 20a receives one or more settings changes from a user. For example, in some embodiments, a user may interact with the user device 20a through a touchscreen, keyboard, pointing device, microphone, and/or other input device to change one or more of the settings of the controller 10, the selectively-operated device 30a, 30b, the event-registration mechanism 6, and/or any other portion of system 2. For example, in various embodiments, a user may set intervals for collecting telemetry data, prices for one or more goods or services, corresponding values of tokens, update approved token data, types of events, and/or change any suitable settings of the system 2. Although specific embodiments are discussed herein, the user device 20a can be used to update any of the controller 10, selectively-operated devices 30a, 30b, event-registration mechanism 6, and/or any other configurable portion of the system 2.

At step 364, the user device 20a generates and transmits a configuration signal to the controller 10. The configuration signal includes one or more updated, corrected, or added configuration settings and/or options for one or more portions of the system 2, for example, the controller 10, the event-registration mechanism 6, and/or the selectively-operated devices 30a, 30b. The configuration signal can be transmitted over any suitable communications channel, such as the communications channel established between the controller 10 and the user device 20a at step 356. The controller 10 is configured to update the configuration settings based on the received configuration signal.

At step 366, the user device 20a receives a confirmation signal from the controller 10 indicating that the selected configurations have been added, updated, and/or otherwise verified. For example, in some instances, the controller 10 generates and transmits a signal to the user device 20a containing the current settings and configuration of the system 2 after applying the updates in the configuration signal received at step 360. A user may verify that all settings and configurations have been updated. In some embodiments, the controller 10 generates a signal indicating that the updated configuration settings have been received and updated without transmitting the current settings of the system 2.

Figure 8:
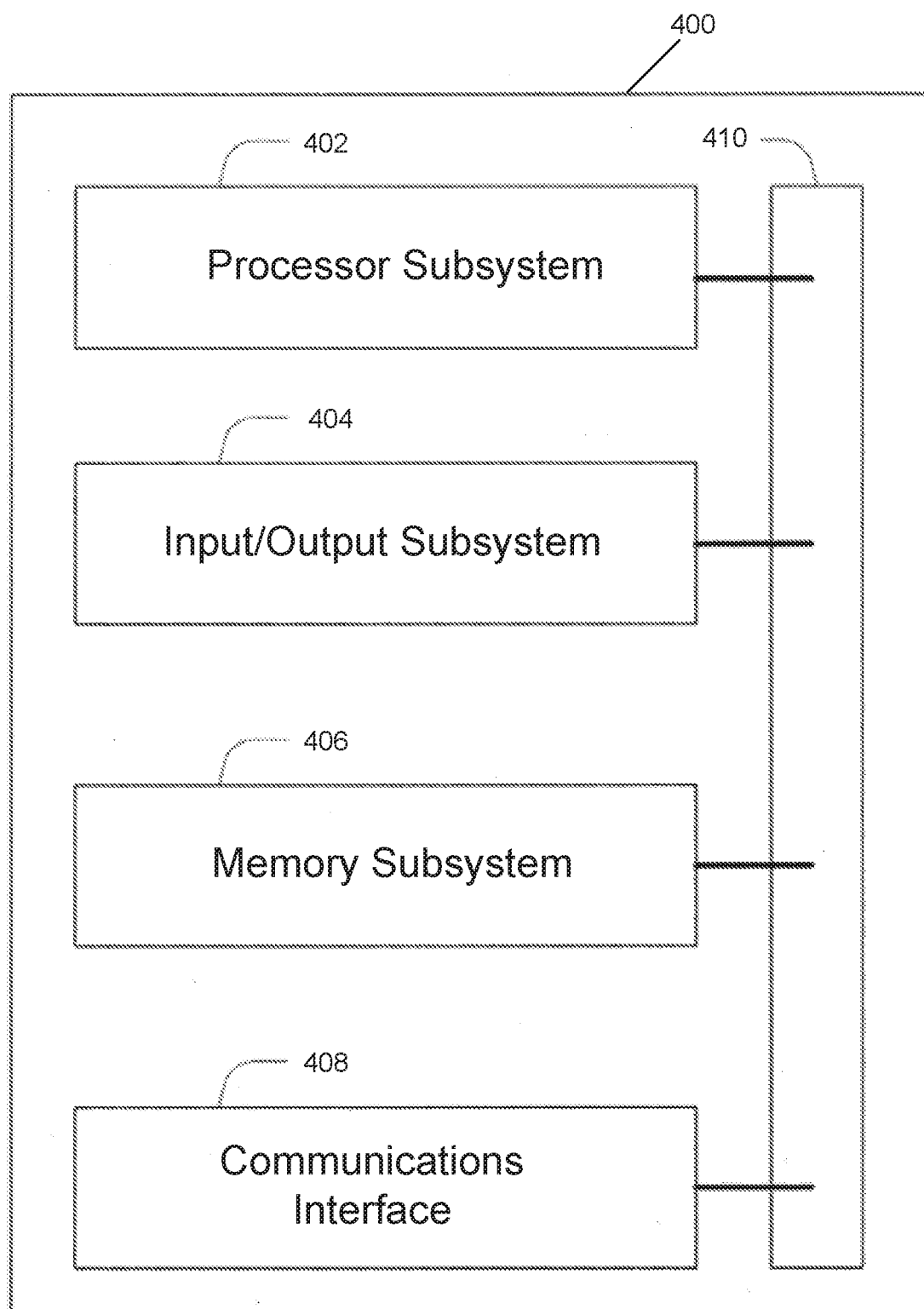
FIG. 8 illustrates a computing device, in accordance with some embodiments.

FIG. 8 illustrates a computing device 400, in accordance with some embodiments. The computing device 400 is a representative device that may be used to implement a controller 10, a user device 20a, and/or any other computational portion of the system 2 discussed above. The computing device 400 includes a processor subsystem 402, an input/output subsystem 404, a memory subsystem 406, a communications interface 408, and a system bus 410. In some embodiments, one or more than one of the components may be combined or omitted such as, for example, not including the communications interface 408. In some embodiments, the computing device 400 may comprise other components not shown in FIG. 8. For example, the computing device 400 also may comprise a power subsystem. In other embodiments, the computing device 400 may comprise multiple instances of one or more of the components shown in FIG. 8. For example, the computing device 400 may comprise multiple memory subsystems 410. For the sake of conciseness and clarity, and not limitation, one of each of the components is shown in FIG. 8.

The processor subsystem 402 may comprise any processing circuitry operative to control the operations and performance of the controller 10, user device 20a, 20b, etc. In various aspects, the processor subsystem 402 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 402 also may be implemented by a controller, a microcontroller, an application specific integrated circuit (ASIC), a field programmable gate array (FPGA), a programmable logic device (PLD), and so forth.

In various aspects, the processor subsystem 402 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the computing device 400 may comprise a system bus 410 that couples various system components including the processing subsystem 402, the input/output subsystem 404, and the memory subsystem 406. The system bus 410 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 404 may comprise any suitable mechanism or component to at least enable a user to provide input to the computing device 400 and the computing device 400 to provide output to the user. For example, the input/output subsystem 404 may comprise any suitable input mechanism, including but not limited to, a button, keypad, keyboard, click wheel, touch screen, or motion sensor. In some embodiments, the input/output subsystem 404 may comprise a capacitive sensing mechanism, or a multi-touch capacitive sensing mechanism.

In some embodiments, the input/output subsystem 404 may comprise a visual peripheral output device for providing a display visible to the user. For example, the visual peripheral output device may comprise a screen such as, for example, a Liquid Crystal Display (LCD) screen, incorporated into the computing device 400. As another example, the visual peripheral output device may comprise a movable display or projecting system for providing a display of content on a surface remote from the computing device 400. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both. The visual peripheral output device may be operative to display content under the direction of the processor subsystem 402. For example, the visual peripheral output device may be able to play media playback information, application screens for application implemented on the computing device 400, information regarding ongoing communications operations, information regarding incoming communications requests, or device operation screens, to name only a few.

In some embodiments, the communications interface 408 may comprise any suitable hardware, software, or combination of hardware and software that is capable of coupling the computing device 400 to one or more networks and/or additional devices. The communications interface 408 may be arranged to operate with any suitable technique for controlling information signals using a desired set of communications protocols, services or operating procedures. The communications interface 408 may comprise the appropriate physical connectors to connect with a corresponding communications medium, whether wired or wireless.

Vehicles of communication may comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery such as a selectively-operated devices 30a, 30b, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, Multi-Drop Bus (MDB), or Peripheral Component Interconnect (PCI) communication, to name only a few examples.

Accordingly, in various aspects, the communications interface 408 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 408 may comprise a wireless interface comprising one or more antennas, transmitters, receivers, transceivers, amplifiers, filters, control logic, and so forth.

In various aspects, the communications interface 408 may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 v3.0, v4.0, v4.1, as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 406.

In some embodiments, the memory subsystem 406 may comprise any non-transitory machine-readable or computer-readable media capable of storing data, including both volatile/non-volatile memory and removable/non-removable memory. The memory subsystem 406 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the computing device 400.

In various aspects, the memory subsystem 406 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of non-transitory media suitable for storing information.

In one embodiment, the memory subsystem 406 may contain an instruction set, in the form of a file for executing one or more methods as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments, a compiler or interpreter is comprised to convert the instruction set into machine executable code for execution by the processing subsystem 402.

Although the subject matter has been described in terms of exemplary embodiments, it is not limited thereto. Rather, the appended claims should be construed broadly, to include other variants and embodiments, which may be made by those skilled in the art.

What is claimed is:

1. A method, comprising:
    establishing, by a controller, a communication channel with a user device;
    receiving, by the controller, an authorization token from the user device, wherein the authorization token includes a verification value;
    extracting, by the controller, the verification value from the received authorization token;
    comparing, by the controller, the verification value of the authorization token to a plurality of stored verification values; and
    operating, by the controller, in a programmable mode in response to the authorization token being verified, wherein the controller is configured to modify configuration data for at least one selectively-operated device in the programmable mode;
    receiving, by the controller, telemetry data for at least one selectively-operated device in signal communication with the controller; and
    transmitting, by the controller, the telemetry data to the user device.

2. The method of claim 1, wherein the verification value is selected from a predetermined set of verification values associated with the controller.

3. The method of claim 1, comprising:
    receiving, by the controller, at least one configuration setting from the user device; and
    applying, by the controller, the at least one configuration to a selectively-operated device in signal communication with the controller.

4. The method of claim 1, wherein the telemetry data includes data for at least one product or service provided by the selectively-operated device.

5. The method of claim 1, comprising:
    receiving, by the controller, one or more updated verification values; and
    updating, by the controller, the plurality of stored verification values to include the one or more updated verification values.

6. The method of claim 5, wherein the one or more updated verification values are stored by a remote system, wherein the remote system is configured to generate one or more authorization tokens.

7. The method of claim 1, comprising receiving, by the controller, a signal from a physical input device, wherein the signal from the physical input device initiates the connection between the controller and the user device.

8. The method of claim 1, comprising:
    receiving, at the controller, a currency signal indicative of currency received at a currency mechanism; and
    transmitting, by the controller, a total value signal to the user device, wherein the total value signal is indicative of one or more currency signals received by the controller.

9. The method of claim 8, wherein the total value signal is indicative of at least one digital payment received by the controller.

10. A method, comprising:
   establishing, by a user device, a communication channel with a controller;
   transmitting, by the user device, an authorization token, wherein the authorization token includes a verification value;
   receiving, by the user device, a configuration signal indicative of one or more current configuration settings of the controller, wherein the configuration signal includes configuration data for at least one selectively-operated device in signal communication with the controller;
   transmitting, by the user device, a request for telemetry data for at least one selectively-operated device in signal communication with the controller; and
   receiving, by the user device, a signal indicative of the telemetry data.

11. The method of claim 10, wherein the verification value is selected from a predetermined set of verification values associated with the controller.

12. The method of claim 10, comprising:
   receiving, by the user device, at least one configuration setting update; and
   transmitting, by the communications user device, the at least one configuration update to the controller, wherein the controller is configured to apply the at least one configuration update to one of the controller or a selectively-operated device in signal communication with the controller.

13. The method of claim 10, wherein the telemetry data includes data for at least one product or service provided by the selectively-operated device.

14. The method of claim 10, comprising:
   receiving, by the user device, one or more updated verification values from a remote server; and
   transmitting, by the user device, the one or more updated verification values to the controller.

15. The method of claim 14, wherein the remote system is configured to generate one or more authorization tokens.

16. A method, comprising:
   establishing, by a user device, a communication channel with a controller;
   transmitting, by the user device, an authorization token, wherein the authorization token includes a verification value;
   receiving, by the user device, a configuration signal indicative of one or more current configuration settings of the controller, wherein the configuration signal includes configuration data for at least one selectively-operated device in signal communication with the controller;
   transmitting, by the user device, a request for a total value of payments received by the controller; and
   receiving, by the user device, a currency signal indicative of currency received at a currency mechanism in signal communication with the controller.

17. The method of claim 16, wherein the currency signal is indicative of at least one digital payment received by the controller.

18. The method of claim 16, wherein the verification value is selected from a predetermined set of verification values associated with the controller.

19. The method of claim 16, comprising:
   receiving, by the user device, at least one configuration setting update; and
   transmitting, by the user device, the at least one configuration update to the controller, wherein the controller is configured to apply the at least one configuration update to one of the controller or a selectively-operated device in signal communication with the controller.

20. The method of claim 16, comprising:
   receiving, by the user device, one or more updated verification values from a remote server; and
   transmitting, by the user device, the one or more updated verification values to the controller.

* * * * *